(12) United States Patent
Jung et al.

(10) Patent No.: US 9,894,572 B2
(45) Date of Patent: Feb. 13, 2018

(54) METHOD FOR RESELECTING CELL BY TERMINAL AND TERMINAL USING SAME

(71) Applicant: LG ELECTRONICS INC., Seoul (KR)

(72) Inventors: Sunghoon Jung, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/034,852

(22) PCT Filed: Nov. 10, 2014

(86) PCT No.: PCT/KR2014/010761
§ 371 (c)(1),
(2) Date: May 5, 2016

(87) PCT Pub. No.: WO2015/069081
PCT Pub. Date: May 14, 2015

(65) Prior Publication Data
US 2016/0277982 A1    Sep. 22, 2016

Related U.S. Application Data

(60) Provisional application No. 61/902,156, filed on Nov. 9, 2013.

(51) Int. Cl.
*G01R 31/08*    (2006.01)
*H04L 5/14*    (2006.01)
(Continued)

(52) U.S. Cl.
CPC ....... *H04W 36/0083* (2013.01); *H04W 36/08* (2013.01); *H04W 36/36* (2013.01);
(Continued)

(58) Field of Classification Search
CPC ..... H04L 47/10; H04L 47/22; H04L 12/5695; H04L 5/1423; H04L 29/06
See application file for complete search history.

(56) References Cited

U.S. PATENT DOCUMENTS

2008/0318577 A1* 12/2008 Somasundaram ......................... H04W 36/0066 455/436
2011/0081903 A1* 4/2011 Cai .................. H04W 36/0055 455/424

(Continued)

FOREIGN PATENT DOCUMENTS

KR    10-2008-0038401 A    5/2008
KR    10-2009-0106571 A    10/2009
(Continued)

OTHER PUBLICATIONS

PCT International Application No. PCT/KR2014/010761, International Search Report dated Feb. 2, 2015, 1 page.

*Primary Examiner* — Faruk Hamza
*Assistant Examiner* — Abu-Sayeed Haque
(74) *Attorney, Agent, or Firm* — Lee, Hong, Degerman, Kang & Waimey

(57) ABSTRACT

Provided are a method for reselecting a cell by a terminal and a terminal using the method. According to the method, region information is received from a first system using a first radio access technology (RAT), and a cell of a second system using a second RAT is selected. The region information informs of a second region of the second system that overlaps a first region in which roaming of the terminal is not allowed in the first system.

7 Claims, 16 Drawing Sheets

(51) Int. Cl.
    *H04B 3/20*    (2006.01)
    *H04J 3/00*    (2006.01)
    *H04W 36/00*   (2009.01)
    *H04W 48/18*   (2009.01)
    *H04W 88/06*   (2009.01)
    *H04W 36/08*   (2009.01)
    *H04W 36/36*   (2009.01)
    *H04W 48/08*   (2009.01)

(52) U.S. Cl.
    CPC .......... *H04W 48/18* (2013.01); *H04W 88/06* (2013.01); *H04W 48/08* (2013.01)

(56) References Cited

U.S. PATENT DOCUMENTS

| | | | | |
|---|---|---|---|---|
| 2012/0294236 A1* | 11/2012 | Watfa | ................ | H04W 60/04 370/328 |
| 2012/0307670 A1* | 12/2012 | Kazmi | ................ | H04W 24/10 370/252 |
| 2013/0109372 A1* | 5/2013 | Ekici | ................ | H04W 24/10 455/422.1 |
| 2013/0310037 A1* | 11/2013 | Ji | ................ | H04W 36/0083 455/436 |
| 2013/0315075 A1* | 11/2013 | Tamura | ................ | H04W 24/10 370/242 |
| 2014/0080506 A1* | 3/2014 | Siomina | ................ | H04W 64/00 455/456.1 |
| 2014/0126403 A1* | 5/2014 | Siomina | ................ | H04W 24/10 370/252 |
| 2015/0207614 A1* | 7/2015 | Das | ................ | H04W 56/0035 370/350 |

FOREIGN PATENT DOCUMENTS

| | | |
|---|---|---|
| KR | 10-2009-0131787 A | 12/2009 |
| KR | 10-2010-0026916 A | 3/2010 |

* cited by examiner

METHOD FOR RESELECTING CELL BY TERMINAL AND TERMINAL USING SAME

CROSS-REFERENCE TO RELATED APPLICATIONS

This application is the National Stage filing under 35 U.S.C. 371 of International Application No. PCT/KR2014/010761, filed on Nov. 10, 2014, which claims the benefit of U.S. Provisional Application No. 61/902,156, filed on Nov. 9, 2013, the contents of which are all hereby incorporated by reference herein in their entirety.

BACKGROUND OF THE INVENTION

Field of the Invention

The present invention relates to a method for reselecting, by user equipment, a cell in a mobile communication system and user equipment using the same.

Related Art

In a mobile communication system, to support the mobility of user equipment (UE) is essential. To this end, UE continues to measure the quality of a serving cell that now provides a service and the quality of neighboring cells. UE having an RRC connection with a base station (BS) reports the results of measurement to a network at a proper time. The network provides the UE with optimal mobility through handover, etc. In contrast, UE (RRC IDLE UE) not having an RRC connection with a BS autonomously continues to perform cell reselection using information, such as the quality of a serving cell and the quality of neighboring cells.

Meanwhile, UE may move between cells within the same network (system) using the same radio access technology (RAT), but may also move between different networks using different RATs. In this case, RRC IDLE UE may perform inter-RAT cell reselection.

When UE makes an ATTACH request in order to access a first system using a first RAT, the access may be rejected due to several reasons. For example, if the UE has not joined the first system using the first RAT, although the first RAT is supported from a UE device aspect, access to the first system may be rejected.

In a situation, such as in the above example, when the first system transmits a rejection message, it may also transmit an indicator providing notification that all the tracking areas (TAs) of a first frequency in which the first system is operated has been barred with respect to the roaming of UE. In this case, the TA is an area including a plurality of cells and may be an area managed by a network in order to check the location of UE, that is, in the idle state. The UE may store a list of TAs in which roaming is barred.

Meanwhile, the UE that has received the indicator considers that roaming for all the TAs of the first system using the first frequency has been barred for a specific time, for example, for a maximum of 300 seconds and performs cell reselection under such a premise. Accordingly, in the cell reselection process, the UE does not select a cell of the first system using the first frequency.

In accordance with a current standard, however, after the specific time elapses, the UE considers a cell of the first frequency to be a candidate cell in a cell reselection process, reads system information from the first frequency, and performs measurement on the cell of the first system. Although the cell of the first system is unable to be selected in a cell reselection process because the cell is included in a TA list for which roaming has been barred, a process for performing measurement and reading system information is unnecessarily repeated.

There is a need for a method and apparatus capable of solving such a problem.

SUMMARY OF THE INVENTION

There are provided a method for reselecting, by UE, a cell and UE using the same.

In an aspect, a method for reselecting, by user equipment (UE), a cell is provided. The method comprising receiving area information from a first system using a first radio access technology (RAT), and selecting a cell of a second system using a second RAT, wherein the area information provides notification of a second area of the second system overlapping a first area of the first system to which access of the UE is barred.

The first area may be an area comprising one or more cells supported in the first system, and the second area may be an area comprising one or more cells supported in the second system.

An ATTACH request may be transmitted to the first system, and an ATTACH reject message may be received from the first system, wherein the ATTACH reject message comprises the area information.

The ATTACH reject message may further comprise information indicative of a reason of the ATTACH reject, and an indicator indicating that roaming of the UE is barred for all areas of the first system.

The area information may comprise a list of areas of the second system overlapping areas to which access is barred in the first system when the UE performs roaming.

The first system may use a first frequency, and the second system may use a second frequency.

If the selected cell of the second system is a cell within the area of the second system included in the list, measurement and system information acquisition may be not performed on cells of the first frequency when a cell is reselected.

If the selected cell of the second system is a cell within an area of the second system not included in the list, measurement and system information acquisition may be performed on cells of the first frequency when a cell is reselected.

The method may further comprise receiving a list providing notification of systems to which the area information is applicable.

In another aspect, a user equipment (UE) performing reselection is provided. The UE may comprise a radio frequency (RF) unit transmitting and receiving radio signals and a processor connected to the RF unit, wherein the processor configured to receive area information from a first system using a first radio access technology (RAT) and select a cell of a second system using a second RAT, wherein the area information provides notification of a second area of the second system overlapping a first area of the first system to which access of the UE is barred.

In an inter-RAT cell reselection process, a process for reading repeatedly generated unnecessary measurement and system information can be reduced. Accordingly, power consumption of UE can be reduced.

DESCRIPTION OF EXEMPLARY EMBODIMENTS

Figure 1:
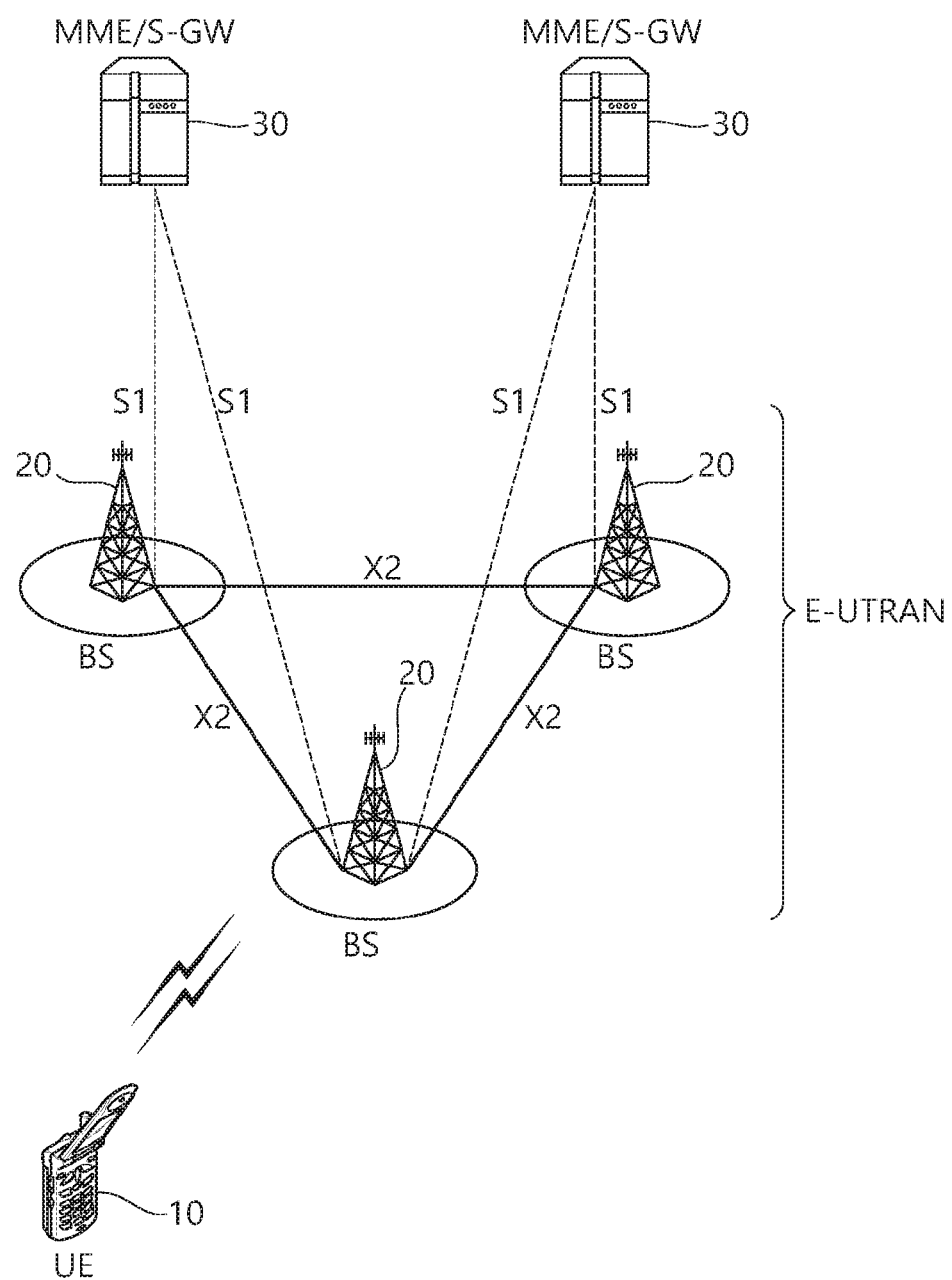
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
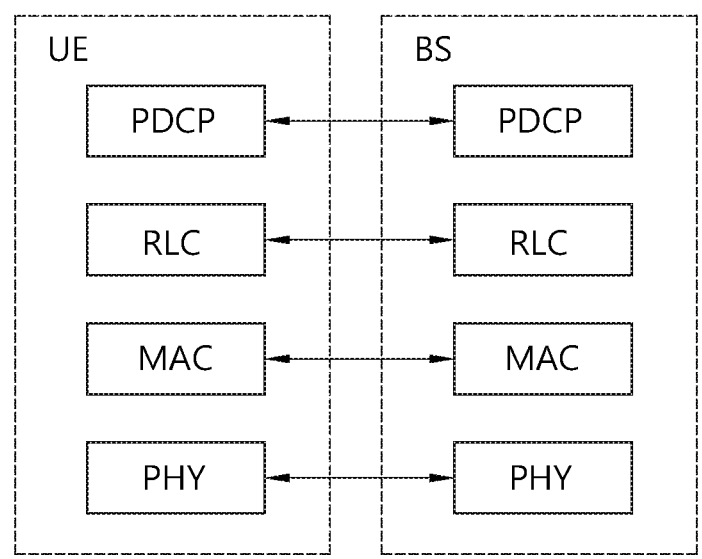
FIG. 2 is a diagram showing a wireless protocol architecture for a user plane.
Figure 3:
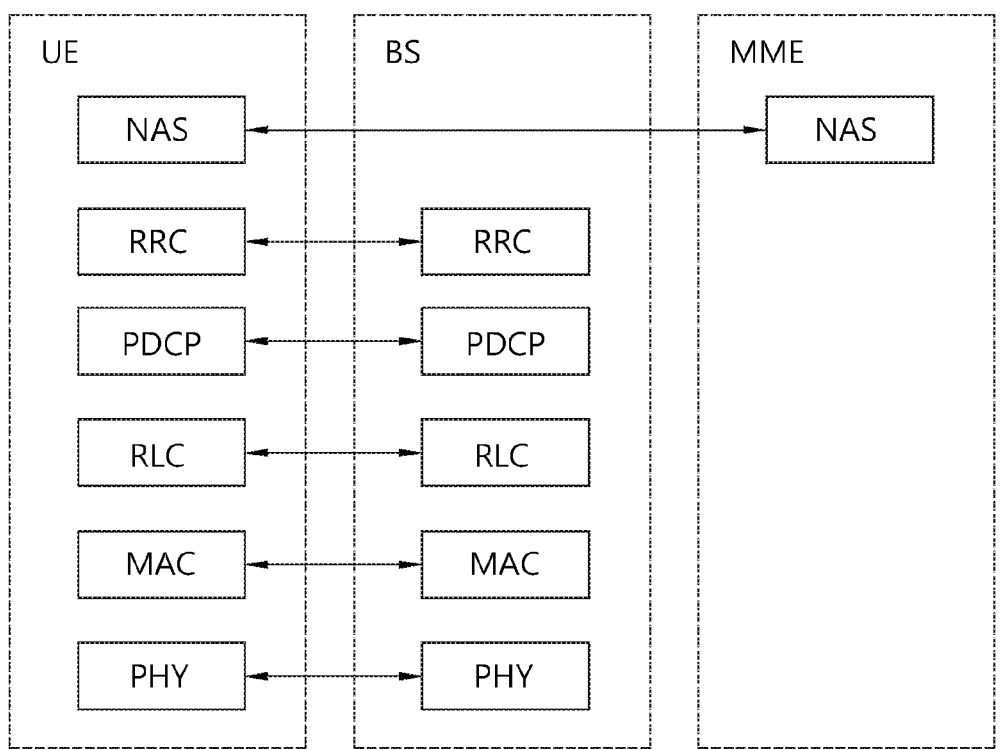
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
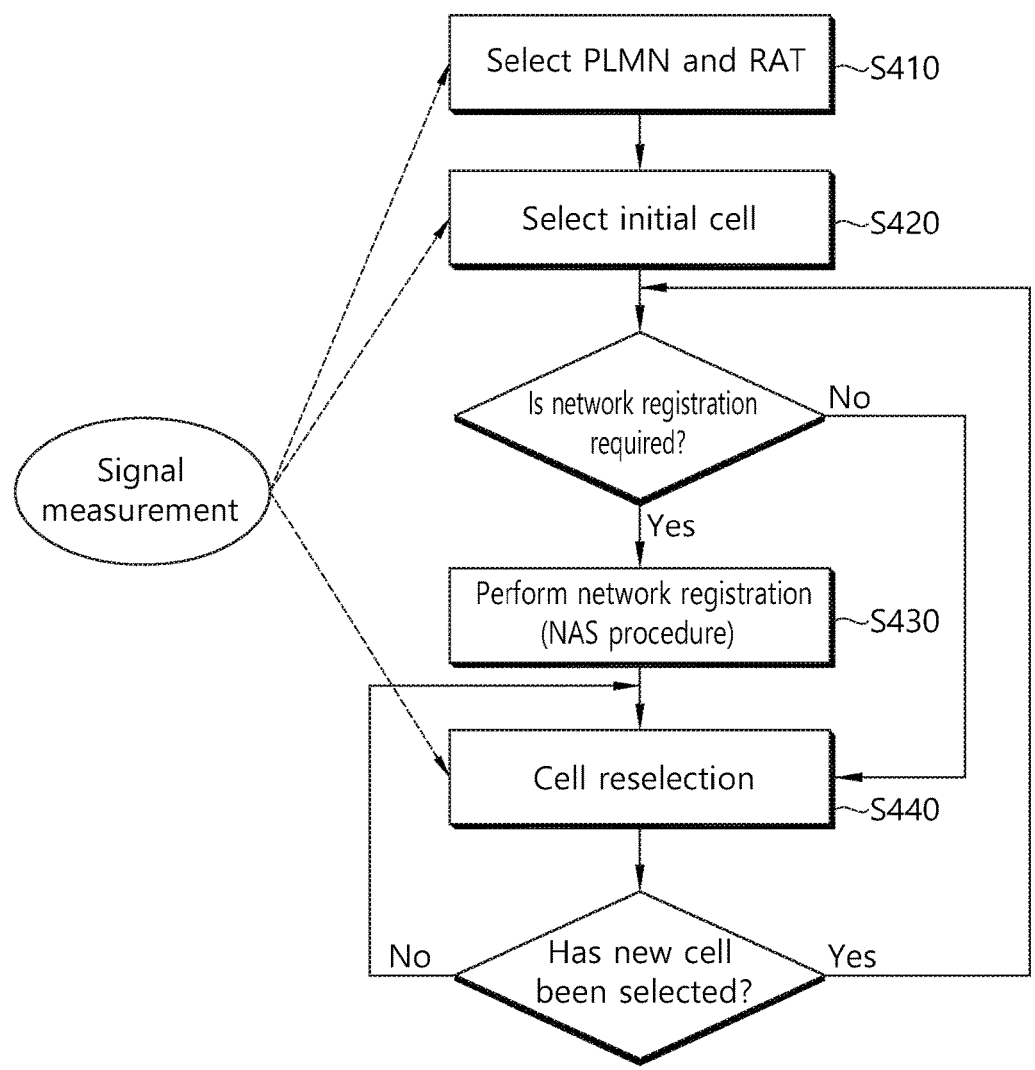
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
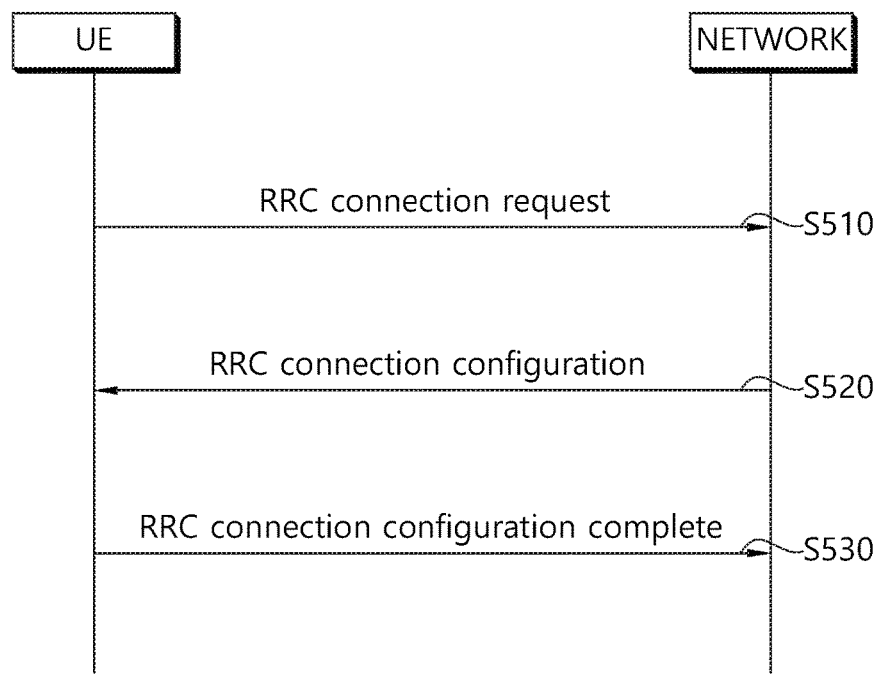
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
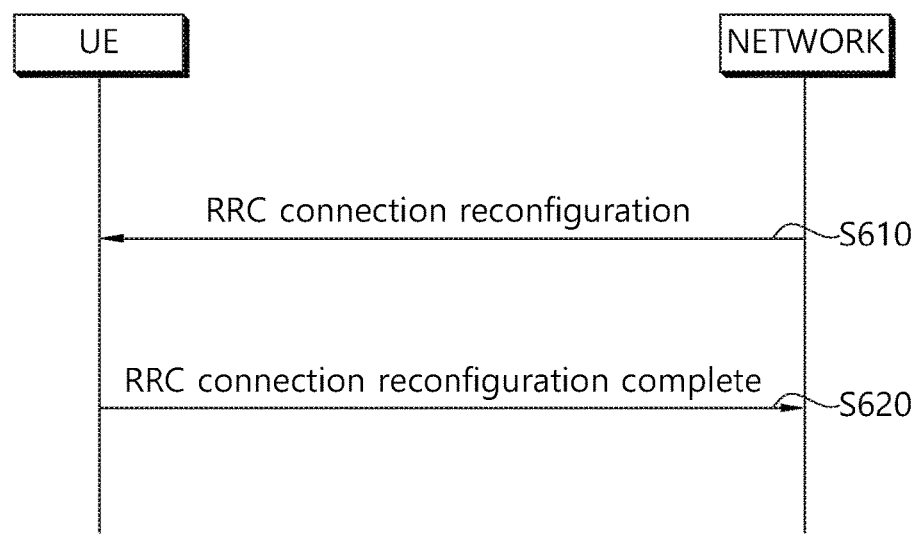
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

A cell selection criterion may be defined as in Equation 1 below.

$$Srxlev > 0 \text{ AND } Squal > 0,$$

where:

$$Srlev = Q_{rxlevmeas} - (Q_{rxlevmin} + Q_{rxlevminoffset}) - P_{compensation},$$

$$Squal = Q_{qualmeas} - (Q_{qualmin} + Q_{qualminoffset}) \qquad \text{[Equation 1]}$$

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Mimimum required RX level in the cell (dBm) |

TABLE 1-continued

| | |
|---|---|
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

$Q_{rxlevminoffset}$ and $Q_{qualminoffset}$ that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection process, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to give the priority of a cell is defined as in Equation 2.

$$R_s = Q_{meas,s} + Q_{hyst} R_n = Q_{meas,n} - Q_{offset}$$

In Equation 2, $R_s$ is the ranking criterion of a serving cell on which UE now camps, $R_n$ is the ranking criterion of a neighboring cell, $Q_{meas,s}$ is the quality value of the serving cell measured by the UE, $Q_{meas,n}$ is the quality value of the neighboring cell measured by the UE, $Q_{hyst}$ is a hysteresis value for ranking, and $Q_{offset}$ is an offset between the two cells.

In Intra-frequency, if UE receives an offset "Qoffsets,n" between a serving cell and a neighbor cell, Qoffset= Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
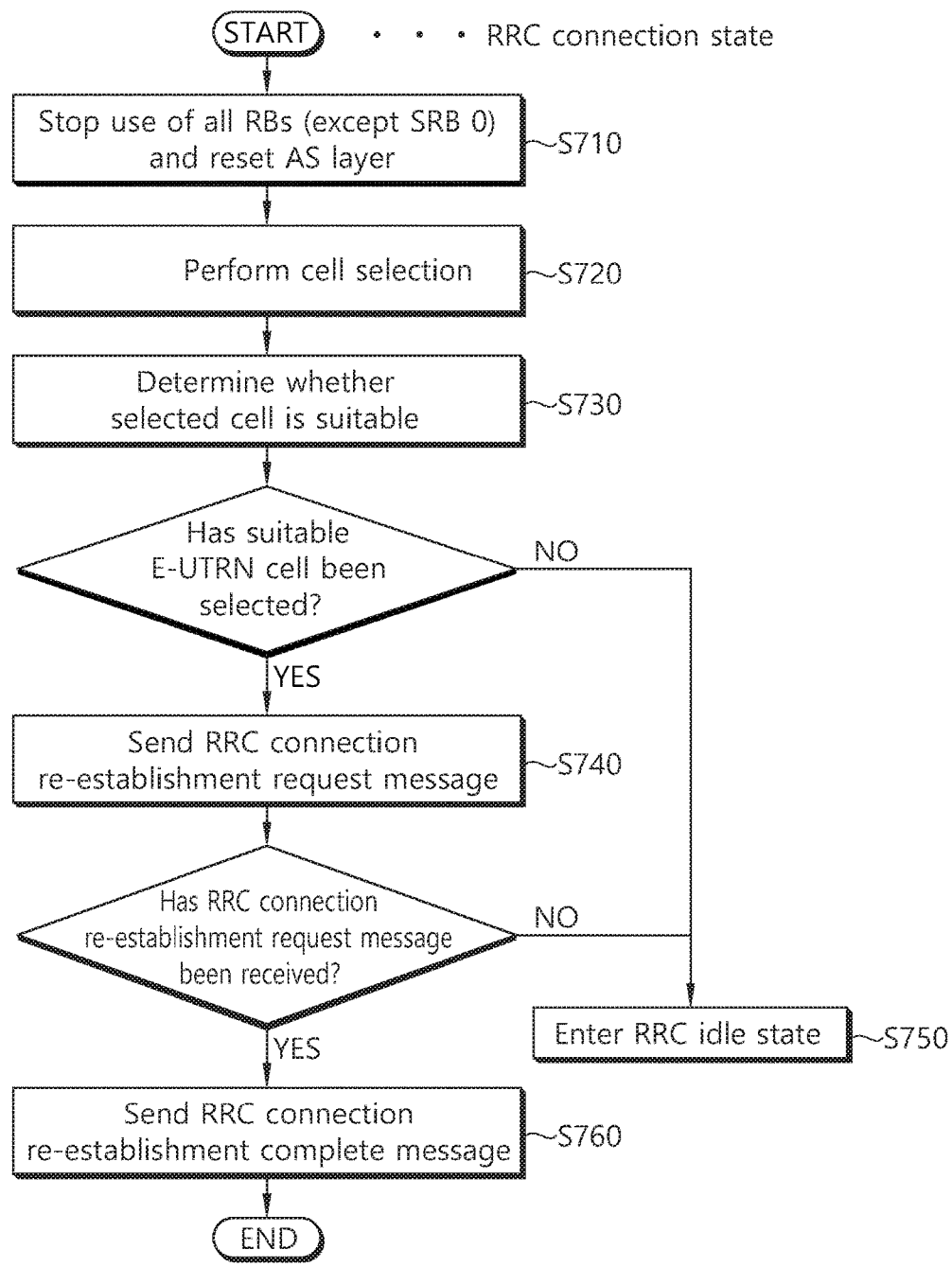
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB 1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

The present invention is now described.

Figure 8:
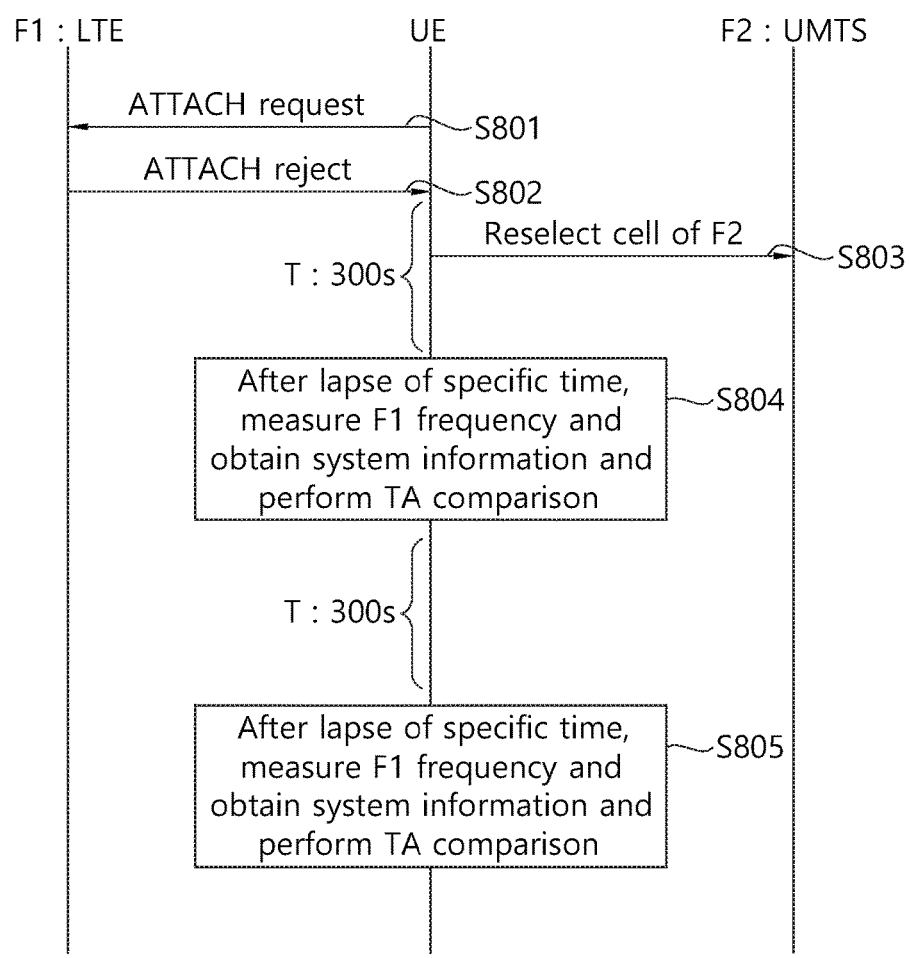
FIG. 8 shows a problem which may be generated in a conventional inter-RAT cell reselection process.

FIG. 8 shows a problem which may be generated in a conventional inter-RAT cell reselection process.

Referring to FIG. 8, UE may make an ATTACH request in order to access a first system (e.g., LTE) using a first frequency F1 and a first RAT (S801). The first system may reject the access of the UE for several reasons. For example, although the UE can support both the first system (LTE) and a second system (a Universal Mobile Telecommunication System (UMTS)) in the device aspect, if the UE has joined only the second system, but has not joined the first system, the first system may reject the access of the UE. The first system transmits an ATTACH reject message (S802).

When the first system transmits the rejection message, it may also transmit an indicator providing notification that all the tracking areas (TAs) of the first frequency in which the first system is operated have been barred with respect to the roaming of the UE.

In this case, roaming means that UE selects another network (a radio operator network) so that it can be automatically provided with data or a service when the UE moves out of coverage of its own network (or a radio operator network). Furthermore, the TA is an area including a plurality of cells in LTE, and may be an area managed by an LTE system in order to check the location of UE in the RRC idle state. The location of UE in the active state, that is, the RRC connection state with a BS, may be checked for each cell, but the location of UE in the RRC idle state may be checked in a TA unit, that is, a regional unit greater than a cell. In an UMTS system, there is a loading area (LA) corresponding to a TA of an LTE system. That is, the LA may be said to be a regional unit greater than a single cell, that is, one of units for checking the location of UE in the UMTS system. That is, the LA may be an area including a plurality of cells.

UE may store a TA list for which roaming is barred.

Meanwhile, the UE that has received the indicator considers that roaming for all the TAs of the first system using the first frequency has been barred for a specific time, for example, for a maximum of 300 seconds and performs cell reselection under such a premise (S803). Accordingly, in the cell reselection process, a cell of the first system using the first frequency are not selected, and the UE may select a cell of the second system (e.g., UMTS) using the second frequency F2.

However, in accordance with the current standard (3GPP), after the specific time elapses, the UE considers the cell of the first frequency to be a candidate cell in a cell reselection process, reads system information from the first frequency, and performs measurement on the cell of the first system (S804).

The cell of the first system cannot be selected in the cell reselection process because it is included in the TA list for which roaming is barred. After the specific time elapses, the UE considers the cell of the first frequency to be a candidate cell again in a cell reselection process, reads system information from the first frequency, and performs measurement on the cell of the first system (S805).

That is, although the cell of the first system cannot be selected in a cell reselection process, the UE unnecessarily reads a process for performing measurement on the cell of the first system and reading system information.

A method and apparatus for solving such a problem are described below.

Figure 9:
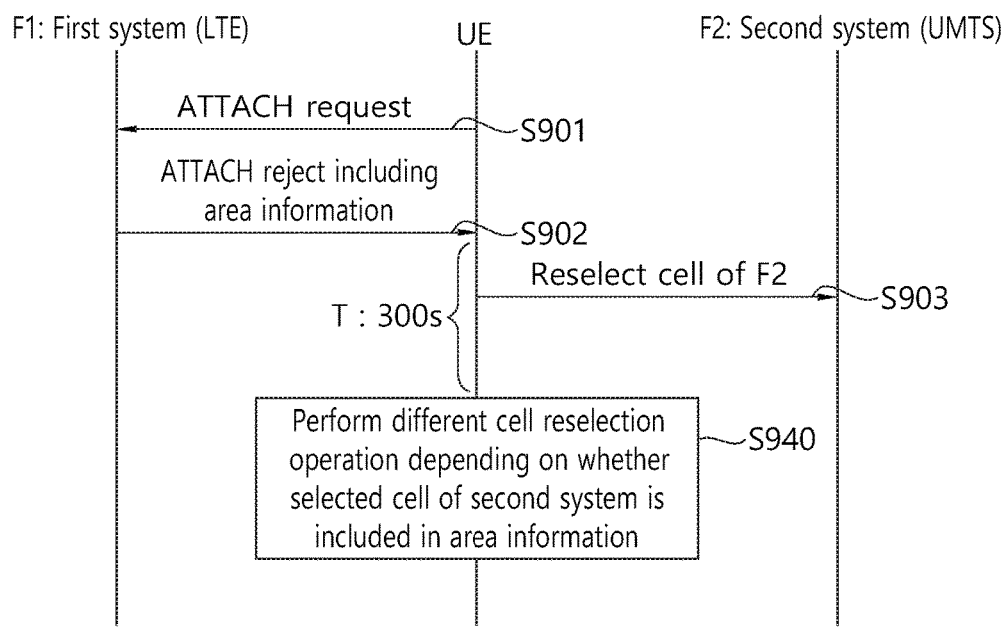
FIG. 9 shows an inter-RAT cell reselection process according to an embodiment of the present invention.

FIG. 9 shows an inter-RAT cell reselection process according to an embodiment of the present invention.

Referring to FIG. 9, UE may make an ATTACH request in order to access a first system (e.g., LTE) using a first frequency F1 and a first RAT (S901).

The first system transmits an ATTACH reject message including area information (S902). The first system may reject the access by transmitting a tracking area (TA) update rejection message. As described with reference to FIG. 8, when the first system transmits the rejection message, it may also transmits an indicator providing notification that the UE's access to all of the TAs of the first frequency in which the first system is operated has been barred. In FIG. 9, area information may be added. Transmitting the indicator to the UE by the first system may provide notification that the roaming of the UE for all of the TAs of the first frequency of the first system has been barred.

In this case, the area information is a kind of network assistance information (NAI), and is information providing notification of the second area of a second system which overlaps a first area barred in the first system when the UE performs roaming. The NAI may be information capable of preventing an attempt to perform unnecessary measurement or to obtain system information in a cell barred for the UE or a barred frequency. The area information may be an example of the NAI.

The area information may include a list of areas of the second system, which overlap respective areas barred in the first system when the UE performs roaming Assuming that the first system is LTE and the second system is an UMTS, the area information may include a list of LAs of the UMTS system, which overlap TAs that belong to the TAs of the LTE system and for which the roaming of the UE has been barred.

For example, it is assumed that the TA 1 and TA 3 of the TA 1, TA 2, TA 3, and TA 4 of an LTE system are TAs barred when the UE performs roaming. If an area formed by the LA 2 and LA 3 of the LA 1, LA 2, LA 3, and LA 4 of an UMTS system includes an area formed by the TA 1 and the TA 3, a list of the LA 2 and the LA 3 is provided as the area information.

The UE considers that access (e.g., roaming) to all of the TAs of the first system using the first frequency has been barred for a specific time, for example, for a maximum of 300 seconds and performs cell reselection under such a premise (S903).

The UE subsequently performs a different cell reselection operation depending on whether the selected cell of the second system is included in the area information, in other words, whether the selected cell is a cell belonging to the area information (S904). This is described in detail with reference to FIG. 10.

Figure 10:
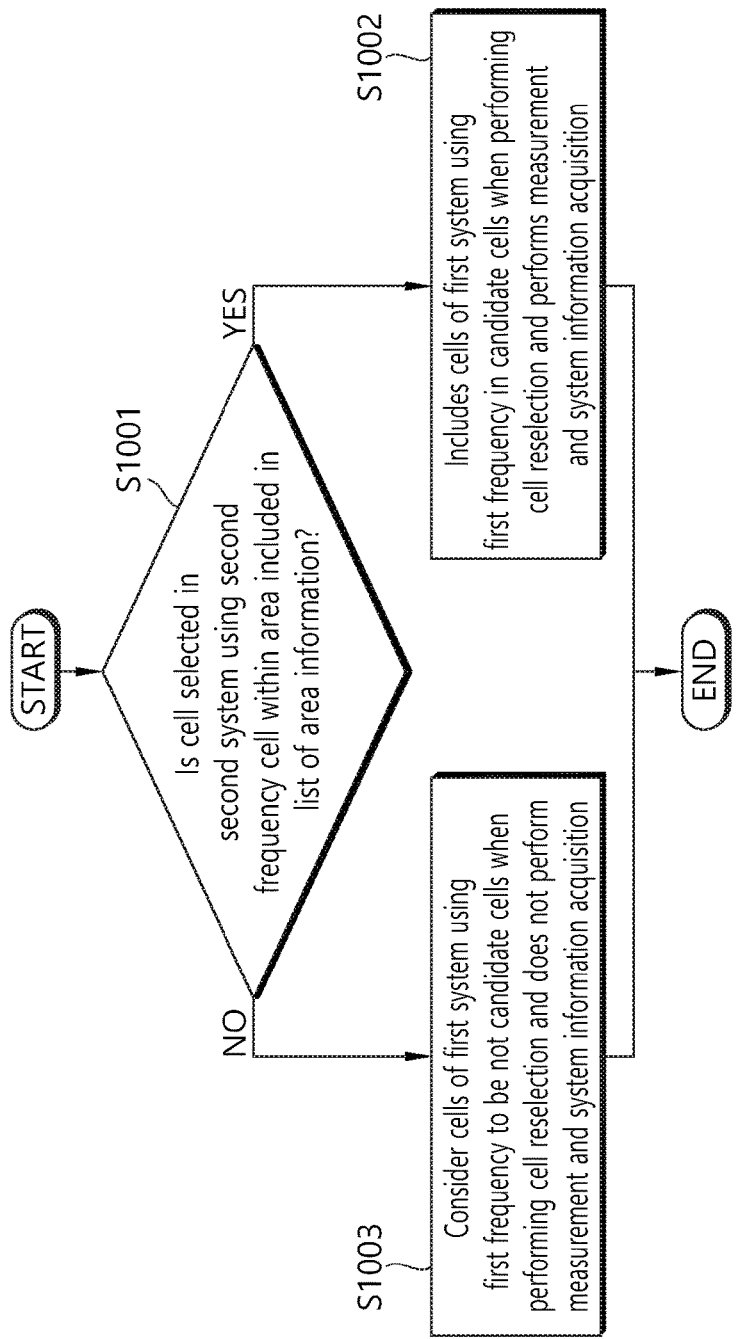
FIG. 10 illustrates a UE operation after S904 of FIG. 9.

FIG. 10 illustrates a UE operation after S904 of FIG. 9.

Referring to FIG. 10, the UE determines whether the cell selected in the second system using the second frequency is a cell within the area included in the list of the area information (S1001). For example, assuming that the first system is LTE and the second system is an UMTS, the UE may determine whether a cell selected in the UMTS system using a second frequency is a cell within an LA included in the LA list of the area information. If the first system is an UMTS and the second system is LTE, the area information may include a TA list. In this case, the UE determines whether a cell selected in the LTE system is a cell included in a TA included in the TA list.

If the cell selected in the second system using the second frequency is a cell within an area included in the list of the area information, the UE considers cells of the first system using the first frequency to be not candidate cells when performing cell reselection and does not perform measurement and system information acquisition (S1002).

In contrast, if the cell selected in the second system using the second frequency is a cell within an area not included in the list of the area information, the UE includes cells of the first system using the first frequency in candidate cells when performing cell reselection and performs measurement and system information acquisition (S1003).

That is, if the UE has requested access to the first system, but the request has been rejected, the first system notifies the UE of information about areas to which the access of the UE (e.g., roaming) has been barred in the first system through the area information by mapping the information to the areas of the second system. If the cell selected in the second system is a cell included in the area included in the area information, it means that the cell is a cell within an area for which the roaming of the UE has been barred in the first system. Although measurement is performed on neighboring cells of the first system using the first frequency upon cell reselection, the neighboring cells may be cells within the cell to which the access of the UE (e.g., roaming) has been barred. Accordingly, the UE considers the neighboring cells to be not candidate cells in a cell reselection process and does not perform cell measurement and system information acquisition. In contrast, if the cell selected in the second system is not a cell within the area included in the area information, it means that the cell may be a cell to which the access of the UE (e.g., roaming) is possible in the first system. Accordingly, upon cell reselection, the UE includes neighboring cells of the first system using the first frequency as candidate cells and performs measurement and system information acquisition.

Meanwhile, although not shown in FIGS. 9 and 10, a network may provide a system list (e.g., a list of PLMNs) to which NAI is applied so that the UE may determine whether NAI, such as the area information, is applicable. Furthermore, the network may indicate a corresponding radio access technology (RAT) which may be applied to PLMNs included in the PLMN list. If the PLMN list is provided, the UE may apply the NAI only when a cell is included in the PLMN list (with respect to an indicated RAT if the RAT is indicated) and camps on the cell.

Embodiments to which the present invention is applied are described below.

First Embodiment

In the first embodiment, it is assumed that an F1 frequency is an LTE frequency and an F2 frequency is an UMTS frequency.

UE performs a series of the following operations. The UE may camp on an LTE cell in the F1 frequency and then start an ATTACH (TAU) process. An LTE system may transmit an ATTACH reject message to the UE. The ATTACH reject message may include information providing notification that all of the TAs of a system to be accessed with respect to roaming have been barred, that is, area information.

The ATTACH reject message may include area information including a list of LAs of an UMTS system, which overlap the TAs of the LTE system for which roaming has been barred.

The UE considers the LTE cell and other cells of the F1 frequency to be not candidate cells for cell reselection for a specific time (e.g., 300 seconds) and reselects an UMTS cell in the F2 frequency. If an LA to which the UMTS cell belongs is included in an LA list included in the area information, the UE considers any cell of the F1 frequency to be not a candidate cell for cell reselection.

If the LA to which the UMTS cell selected by the UE in the F2 frequency belongs is not included in the LA list, the UE considers cells of the F1 frequency to be candidate cells for cell reselection and performs cell measurement.

Second Embodiment

In the second embodiment, unlike in the first embodiment, it is assumed that an F1 frequency is an UMTS frequency and an F2 frequency is an LTE frequency.

UE may perform a series of the following operations. The UE may camp on an UMTS cell in the F1 frequency and then start an ATTACH (TAU) process. An UMTS system may transmit an ATTACH reject message to the UE. The ATTACH reject message may include information providing notification that all of the LAs of a system to be accessed with respect to roaming have been barred, that is, area information.

The ATTACH reject message may include area information including a list of TAs of an LTE system, which overlap the LAs of the UMTS system for which roaming has been barred.

The UE considers the UMTS cell and other cells of the F1 frequency to be not candidate cells for cell reselection for a specific time (e.g., 300 seconds) and reselects an LTE cell in the F2 frequency. If a TA to which the LTE cell belongs is included in a TA list included in the area information, the UE considers any cell of the F1 frequency to be not a candidate cell for cell reselection.

If the TA to which the LTE cell selected by the UE in the F2 frequency belongs is not included in the TA list, the UE considers the cells of the F1 frequency to be candidate cells for cell reselection and performs cell measurement.

Meanwhile, in the first and the second embodiments, each system may indicate a time interval in which a specific frequency is considered to be not a candidate frequency in a cell reselection process with respect to the UE.

If the UE has selected a specific cell for roaming, but the specific cell is a cell belonging to a barred TA, the UE may consider the frequency of the specific cell to be not candidate for cell reselection during the time interval.

The time interval may be signaled by a cell (a barred cell) within a TA for which the roaming of the UE has been barred in the first system. Alternatively, the time interval may be signaled by another cell other than the barred cell. Another cell may use the same RAT as the barred cell or may use an RAT different from the RAT of the barred cell. The time interval may be signaled in another frequency other than a frequency to which the barred cell belongs. In this case, frequency information to which the time interval is applied, RAT information, etc. may also be signaled.

Figure 11:
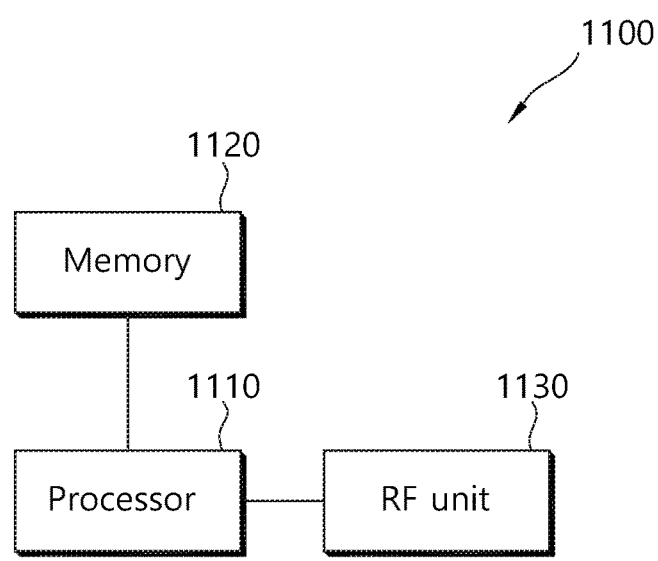
FIG. 11 is a diagram showing the configuration of a UE device according to the present invention.
Figure 12:
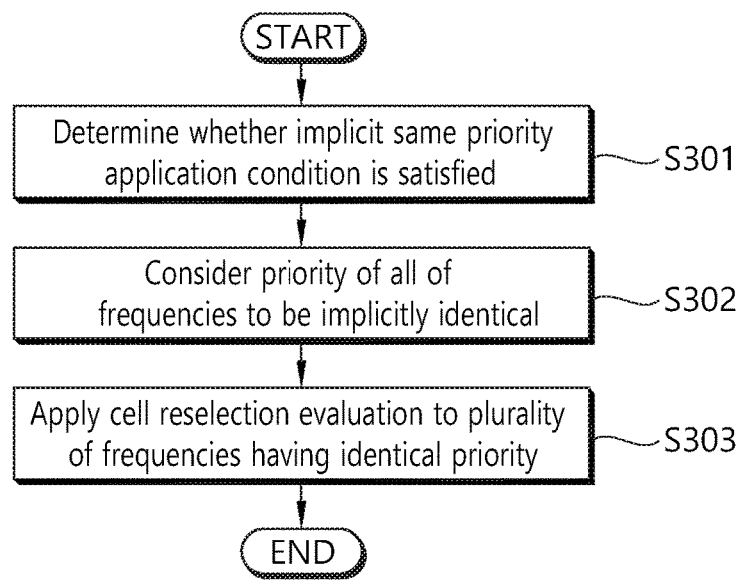
Figure 13:
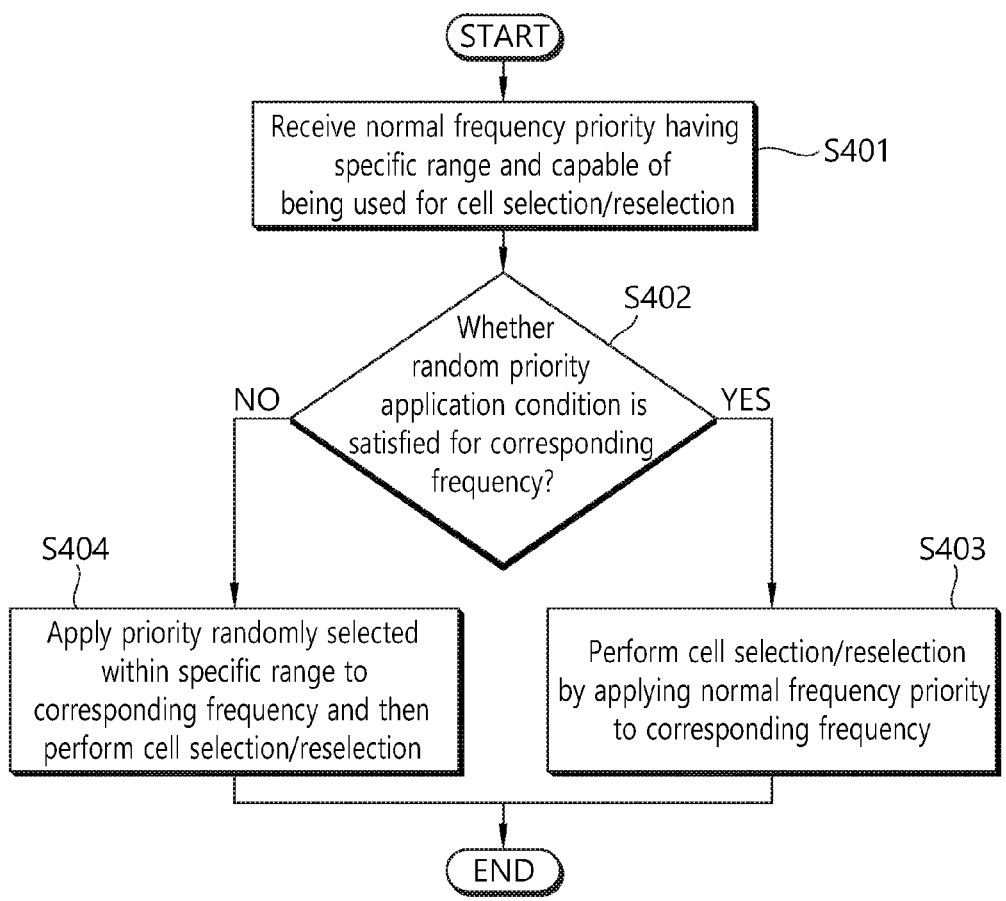
Figure 14:
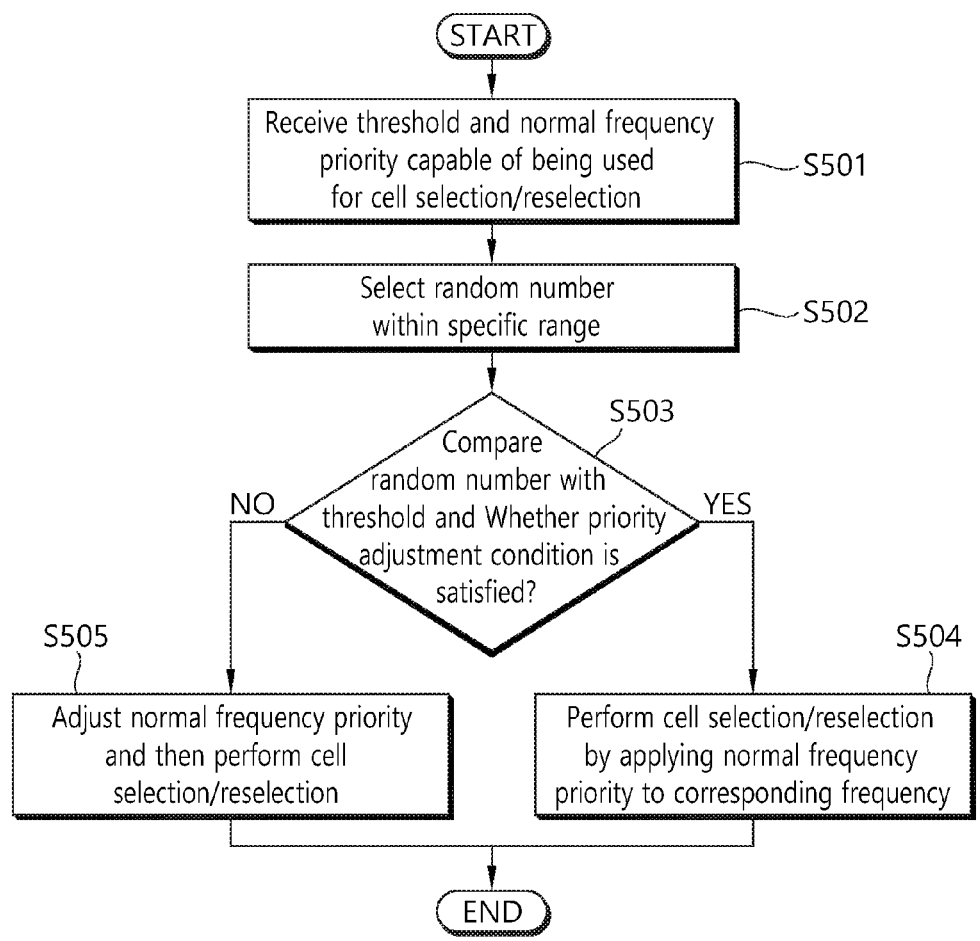
Figure 15:
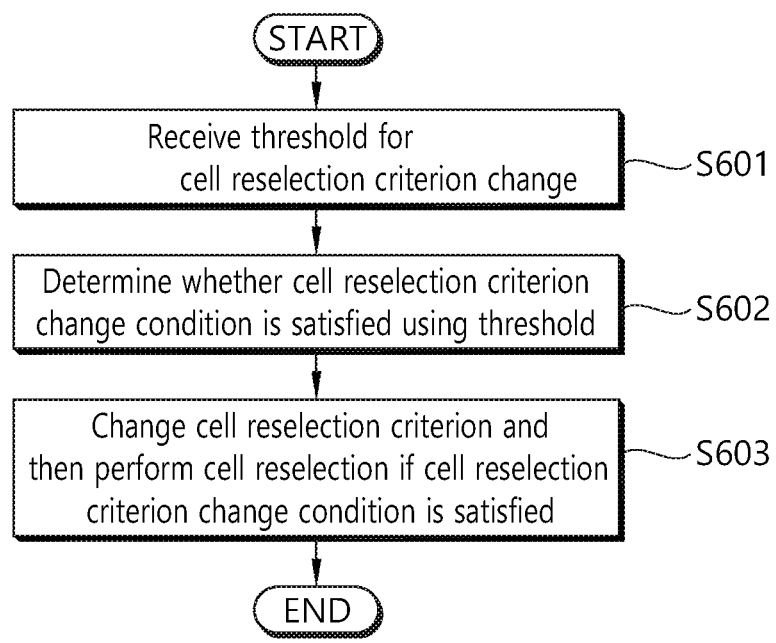
Figure 16:
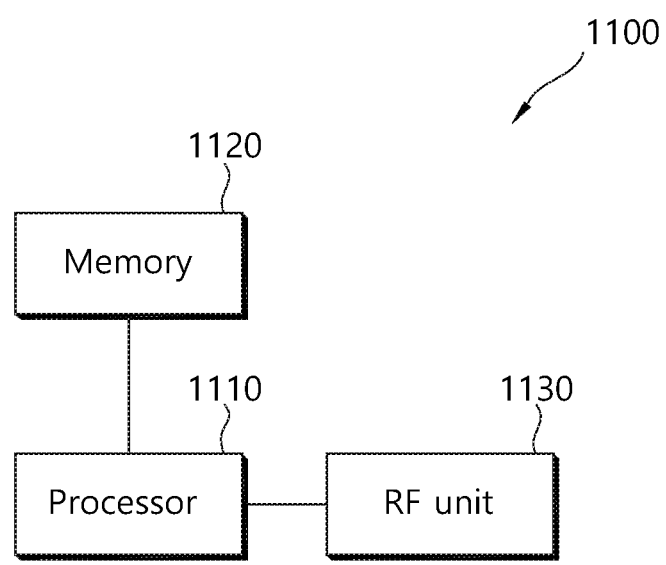

FIG. 11 is a diagram showing the configuration of a UE device according to the present invention.

Referring to FIG. 11, the UE device 1100 includes a processor 1110, memory 1120, and a radio frequency (RF) unit 1130. The processor 1110 implements the proposed functions, processes and/or methods. For example, the processor 1110 also receives area information when receiving an ATTACH reject message by making an ATTACH request from a first system using a first RAT. The processor may select a cell of a second system using a second RAT and then perform a different cell reselection operation depending on whether the cell of the second system is a cell within an area indicated by the area information.

The RF unit 1130 is connected to the processor 1110 and transmits and receives radio signals.

The processor may include application-specific integrated circuits (ASICs), other chipsets, logic circuits, and/or data processors. The memory may include read-only memory (ROM), random access memory (RAM), flash memory, memory cards, storage media and/or other storage devices. The RF unit may include a baseband circuit for processing a radio signal. When an embodiment is implemented in software, the aforementioned scheme may be implemented using a module (process or function, etc.) which performs the aforementioned function. The module may be stored in the memory and executed by the processor. The memory may be disposed to the processor internally or externally and connected to the processor using a variety of well-known means.

What is claimed is:

1. A method for reselecting a cell, the method performed by a user equipment (UE) and comprising:
receiving area information from a first system using a first radio access technology (RAT) and a first frequency; and
selecting a cell of a second system using a second RAT and a second frequency, wherein the area information provides notification of a second area of the second system overlapping a first area of the first system to which access of the UE is barred, wherein the area information comprises a list of areas of the second system overlapping areas to which access is barred in the first system when the UE performs roaming, and wherein if the selected cell of the second system is a cell within the area of the second system included in the list, measurement and system information acquisition are not performed on cells of the first frequency when a cell is reselected.

2. The method of claim 1, wherein:

the first area is an area comprising one or more cells supported in the first system, and the second area is an area comprising one or more cells supported in the second system.

3. The method of claim 1, wherein:

an ATTACH request is transmitted to the first system, and an ATTACH reject message is received from the first system, wherein the ATTACH reject message comprises the area information.

4. The method of claim 3, wherein the ATTACH reject message further comprises:

information indicative of a reason of the ATTACH reject, and an indicator indicating that roaming of the UE is barred for all areas of the first system.

5. The method of claim 1, wherein if the selected cell of the second system is a cell within an area of the second system not included in the list, measurement and system information acquisition are performed on cells of the first frequency when a cell is reselected.

6. The method of claim 1, further comprising receiving a list providing notification of systems to which the area information is applicable.

7. A user equipment (UE) comprising:

a radio frequency (RF) unit transmitting and receiving radio signals; and a processor connected to the RF unit, wherein the processor is configured to receive area information from a first system using a first radio access technology (RAT) and a first frequency, and select a cell of a second system using a second RAT and a second frequency, wherein the area information provides notification of a second area of the second system overlapping a first area of the first system to which access of the UE is barred, wherein the area information comprises a list of areas of the second system overlapping areas to which access is barred in the first system when the UE performs roaming, and wherein if the selected cell of the second system is a cell within the area of the second system included in the list, measurement and system information acquisition are not performed on cells of the first frequency when a cell is reselected.

* * * * *